United States Patent [19]

Ikeura

[11] 4,406,262
[45] Sep. 27, 1983

[54] ENGINE IDLING SPEED CONTROL SYSTEM AND METHOD FOR AN INTERNAL COMBUSTION ENGINE

[75] Inventor: Kenji Ikeura, Yokosuka, Japan

[73] Assignee: Nissan Motor Company, Ltd., Kanagawa, Japan

[21] Appl. No.: 346,377

[22] Filed: Feb. 5, 1982

Related U.S. Application Data

[63] Continuation of Ser. No. 141,978, Apr. 21, 1980, abandoned.

[30] Foreign Application Priority Data

| Apr. 24, 1979 | [JP] | Japan | 54-49660 |
| May 29, 1979 | [JP] | Japan | 54-65662 |
| May 29, 1979 | [JP] | Japan | 54-65664 |

[51] Int. Cl.$^3$ ............................ F02D 1/04; G06F 7/70
[52] U.S. Cl. ........................................ 123/339; 123/349
[58] Field of Search ............... 123/339, 340, 395, 349, 123/489, 440, 585, 586, 587, 588, 589, 325

[56] References Cited

U.S. PATENT DOCUMENTS

| 4,167,396 | 9/1979 | Kondo et al. | 123/489 |
| 4,170,201 | 10/1979 | Camp et al. | 123/489 |
| 4,186,691 | 2/1980 | Takase et al. | 123/325 |
| 4,191,051 | 3/1980 | Kawata et al. | 73/347 |
| 4,237,838 | 12/1980 | Kinugawa et al. | 123/327 |
| 4,240,145 | 12/1980 | Tano et al. | 364/431 |
| 4,244,023 | 1/1981 | Johnson | 123/340 |

Primary Examiner—Raymond A. Nelli
Attorney, Agent, or Firm—Lowe, King, Price & Becker

[57] ABSTRACT

Disclosed is an electronic automatic control method and system for controlling an air flow rate for an internal combustion engine of an automotive vehicle. The system includes an open loop control and a feedback control which are selectively effected corresponding to engine condition. The system includes an engine or temperature range within which the system controls engine speed. The given temperature range corresponds to a normal ambient temperature range so as to improve warming up efficiency upon starting engine under cold engine conditions. The system further includes a means for determining a feedback control condition to effect feedback control at a specific engine condition. In the feedback condition, the variable rate of a control duty cycle pulse which is applied to an electrically operative air flow rate adjusting means, is determined corresponding to an actual engine speed and a difference between the actual engine speed and a reference engine speed determined corresponding to the engine or coolant temperature.

52 Claims, 12 Drawing Figures

ENGINE IDLING SPEED CONTROL SYSTEM AND METHOD FOR AN INTERNAL COMBUSTION ENGINE

This is a continuation of application Ser. No. 141,978, filed Apr. 21, 1980, now abandoned.

BACKGROUND OF THE INVENTION

1. Field of the Invention

The present invention relates generally to an intake air flow rate control system for an internal combustion engine of an automotive vehicle. More specifically, the present invention relates to a microprocessor implemented, automatic electronic intake air flow rate control system in use in an automotive vehicle for internal combustion engine, and particularly to such a system for controlling air flow rate during engine idling.

2. Description of the Prior Art

In recent years, pollution of the atmosphere by nitrogen oxides $NO_x$, carbon monoxide CO, gaseous sulfurous acid and so on produced in the exhaust gas of automotive vehicles has become a serious social problem. In addition to this, the price of fuel, i.e. gasoline or petrol, for automotive vehicles has become higher and higher, because of the limited resources thereof. For preventing atmospheries pollution caused by exhaust gas of vehicles and for using fuel economically, it has become necessary current automotive vehicles to control engine speed accurately even when the vehicle engine is idling.

SUMMARY OF THE INVENTION

The present invention provides control of the engine idle speed by controlling the air flow rate flowing through an idle port passage and a passage which by-passes the throttle valve in an intake air passage.

The present invention is more particularly directed to control of the idling engine speed by controlling the intake air flow rate corresponding to or based on engine or coolant temperature. Preferably, a reference engine speed is determined corresponding to the engine or coolant temperature and is corrected corresponding to conditions of other operation parameters, such as the switch position of a neutral switch of a transmission, the kind of transmission, whether an air conditioner is operating and so on. Further, it will be also preferable to increase the reference engine speed, which is a target engine speed determined based on the coolant temperature and other operation parameters, when a vehicle battery voltage drops. Still further, it will be desirable to allow manual adjustment of the reference engine speed.

In microcomputer implemented feedback control for internal combustion engine in use with a microcomputer, the control signal generated by a control signal generator which consists of a proportional element and an integral element is fed back so as to control the air flow rate. In the conventional control system, the constants of the proportional and integral elements are fixed values. Since the response time period from the time when the intake air flow rate is varied to the time when the engine speed is actually changed reduces with increased engine speed, when the engine speed is relatively low, a response delay will undersirably occur, while when the engine speed is relatively high, the response will be excessively quick to possibly cause hunting. To prevent this, it is desirable to vary the proportional and integral constants corresponding to the actual engine speed and difference between the reference designated engine speed and the actual engine speed.

Therefore, it is a general object of the present invention to provide an improved internal combustion engine control system for controlling engine idling speed wherein control system is capable of exactly determining engine speed corresponding to engine operating conditions.

It is a more specific object of the present invention to provide an internal combustion engine control system which controls engine speed corresponding to an engine temperature or a coolant temperature so as to adapt the engine speed to the engine speed determined based on the engine temperature or coolant temperature.

Another object of the present invention is to provide an internal combustion engine control system in which the reference designated engine speed is maintained constant within a given coolant temperature range which corresponds to a normal atmospheric temperature range.

A further object of the present invention is to provide an internal combustion engine control system capable of correcting the reference engine speed determined based on the coolant temperature, with respect to other operation parameters of the engine, such as whether the transmission is in drive or neutral state, kind of transmission, whether the air conditioner is operating and so on.

A further object of the present invention is to provide an internal combustion engine control system which can increase the reference engine speed in response to a drop of vehicle battery voltage.

A still further object of the present invention is to provide an internal combustion engine control system permitting manual adjustment of the reference engine speed.

A still further object of the present invention is to provide an internal combustion engine control system in which a control signal generator has a proportional element and integral element and a constant of the proportional element and a constant of the integral element can be varied corresponding to actual engine speed and difference between the reference engine speed and the actual engine speed in feed back control.

According to the present invention, there is provided a control system for controlling an intake air flow rate for an internal combustion engine of an automotive vehicle, wherein the system can effectively follow change of engine condition. The system includes means for determining a reference engine speed corresponding to an engine temperature measured by an engine temperature sensing means. The reference engine speed is maintained at a constant speed within a given engine temperature range. The system further inludes means for developing a control signal for controlling the air flow rate with respect to the determined reference engine speed. The control signal varies the rate for increasing or decreasing air flow, based on an actual engine speed and a difference of engine speed between the reference engine speed and the actual engine speed.

In the preferred embodiment, the system further comprises means for determining a correction value of the reference engine speed corresponding to varying of load applied to the engine in the idling condition, dropping of battery voltage, and varying of required air amount of the engine.

In the control system according to the present invention, the reference speed is maintained at a constant speed within a given engine or coolant temperature range which corresponds to a normal ambient temperature range. Thus, starting the engine under cold engine condition is quite satisfactory and effective so as to prevent increasing of harmful component in the exhaust gas and lead to economical use of fuel.

According to the method for controlling an intake air flow rate for an internal combustion engine, at first a reference engine speed is determined corresponding to an engine temperature. When the engine temperature is in a given range, the reference engine speed is maintained at a given speed which is comparably higher than that within a normal temperature range. A control signal to control the air flow rate is determined with respect to the difference between the reference engine speed and the actual engine speed. The response characteristics of the control signal generator is varied corresponding to an actual engine speed and a difference between the actual engine speed and the reference engine speed.

Preferably, the reference engine speed is corrected with respect to engine load condition which is varied by the operating condition of various engine equipment and so on. Further, the engine temperature range, within which the reference engine speed is maintained, corresponds to the normal ambient temperature range for effectively warming up the engine upon starting the engine under cold engine condition. This will result in reducing amount of fuel consumption for warming up and decreasing pollutant in the exhaust gas.

Other objects and advantages sought in the present invention will become apparent from following description and accompanying claims.

BRIEF DESCRIPTION OF THE DRAWINGS

The present invention will become more fully understood from the detailed description given below, and the accompanying description of the preferred embodiment of the present invention, which, however, are not to be taken as limitative of the present invention in any way, but are for the purpose of illustration and explanation only.

In the drawings:

FIG. 3 is a graph showing modifications of the graph of FIG. 2, in which are shown the varying of the reference engine speed according to various other operation parameters for the engine, such as whether the transmission is in drive or neutral, kind of transmission, whether the air conditioner is operating and so on.

FIGS. 8(A) to 8(E) are explanatory illustrations of a process of correcting the reference engine speed by manual operation;

DESCRIPTION OF THE PREFERRED EMBODIMENT

Figure 1:
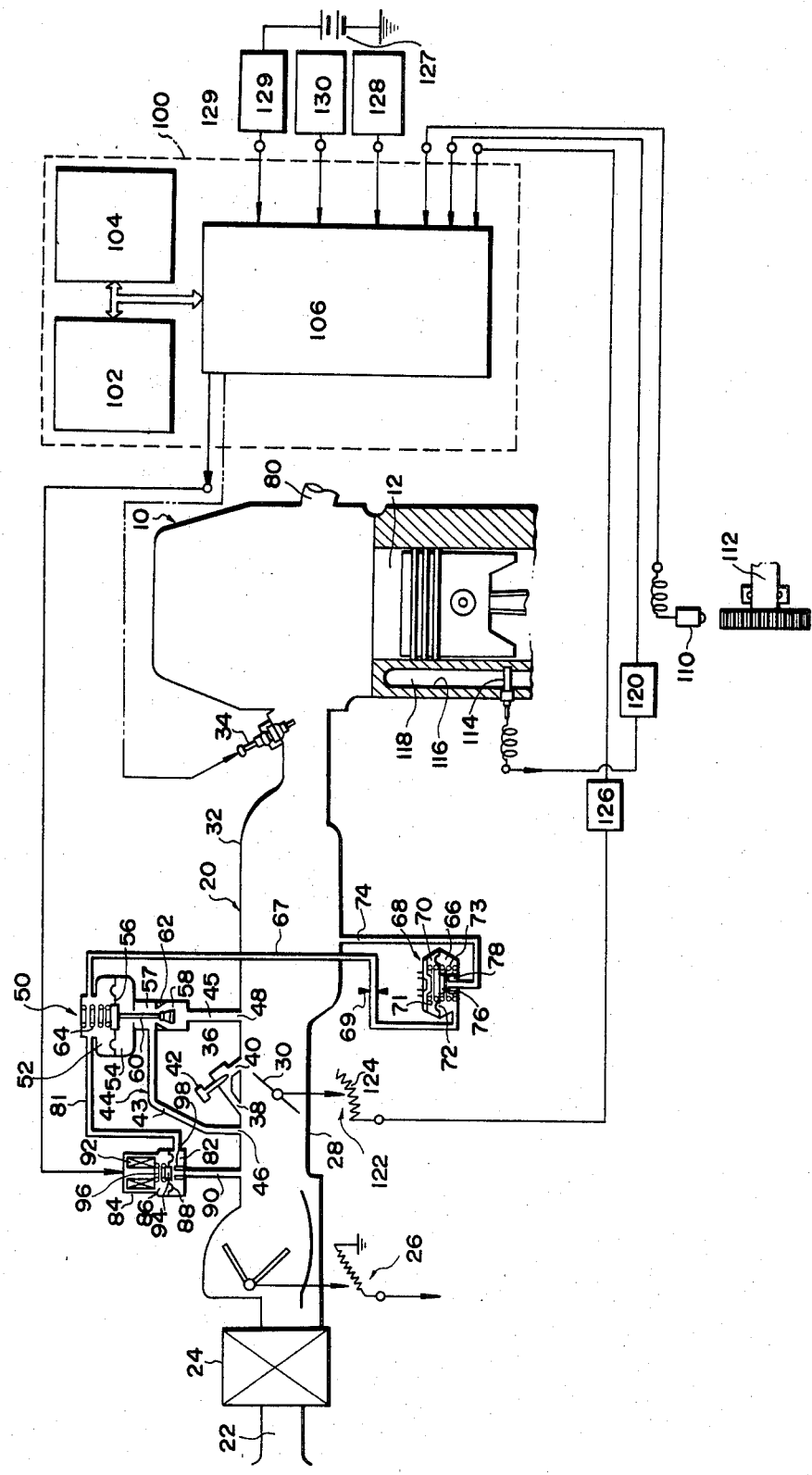
FIG. 1 is a schematic diagrammatical view of the general construction of an internal combustion engine to which is applied an engine control system according to the present invention.

Referring now to the drawings, and particularly to FIG. 1, the general construction of an internal combustion engine having a computer controlled fuel injection system, to be provided on an automotive vehicle is shown. An air flow rate control system according to the present invention as applied to this internal combustion engine is shown as an example and for the purposes of explanation only, and should not be taken as limitative of the scope of the present invention. Before moving onto the detailed description, it should be appreciated that the air flow rate control system according to the present invention will be applicable to any type of internal combustion engine which can be controlled by a microcomputer mounted on the vehicle.

In FIG. 1, each of the engine cylinders 12 of an internal combustion engine 10 communicates with an air intake passage generally designated by 20. The air intake passage 20 comprises an air intake duct 22 with an air cleaner 24 for cleaning atmospheric air, an air flow meter 26 provided downstream of the air intake duct 22 to measure the amount of intake air flowing therethrough, a throttle chamber 28 in which is disposed a throttle valve 30 cooperatively coupled with an accelerator pedal (not shown), so as to adjust the flow rate of intake air flowing therethrough, and an intake manifold 32 having a plurality of branches not clearly shown in FIG. 1. Although not clearly illustrated in FIG. 1, the air flow mater is incorporated with another engine control system which determines fuel injection rate, for example. A fuel injector 34 is provided on the intake manifold 32. The rate of injection of fuel through the fuel injector 34 is controlled by an adjustor, such as, an electromagnetic actuator (not shown). The adjusting is electrically operated by another control system which determines fuel injection rate, fuel injection timing and so on corresponding to engine condition sensed by various engine parameter sensing means. It should be noted that, although the fuel injector 34 is disposed on the intake manifold 32 in the shown embodiment, it is possible to locate it in the combustion chamber 12 in a per se well known manner.

An idle port passage 36 is provided opening into the throttle chamber 28. One end port 38 of the idle port passage 36 opens upstream of the throttle valve 30, and the other end port 40 opens downstream of the throttle valve 30, so that the idle port passage 36 bypasses the throttle valve 30. An idle adjusting screw 42 is provided in the idle port passage 36. The idle adjusting screw 42 is automatically operable as explained hereinafter, controlled by an electronic control device, so as to adjust the flow rate of intake air flowing through the idle port passage 36. A bypass passage 44 is also provided to the intake air passage 20. One end 46 of the bypass passage 44 opens between the air flow meter 26 and the throttle valve 30 and the other end 48 opens downstream of the throttle valve 30, adjacent to the intake manifold 32. Thus the bypass passage 44 bypasses the throttle valve 30 and connects upstream of the throttle valve 30 to the intake manifold 32. An idle control valve, generally designated by 50, is provided in the bypass passage 44. The idle control valve 50 generally comprises two chambers 52 and 54 separated by a diaphragm 56. The chamber 54 communicates with the atmosphere. The bypass passage 44 is thus separated by the valve means 50 into two portions 43 and 45 respectively located upstream and downstream of the port 57 of the valve 50. The valve means 50 includes a poppet valve 58 disposed within the portion 57 in a manner such that it is movable between two positions, one being opening the valve to establish communication between the portions 43 and 45 of the passage 44 and the other being closing the same. The poppet valve element 58 has a stem 60 whose end is secured to the diaphragm 56 so as to cooperatively move therewith. The diaphragm 56 is biased downwards in the drawing, so as to release the valve element 58 from a valve seat 62, by a helical compression coil spring 64 disposed within the chamber 52 of the valve means 50. Thereby, the valve 50 is normally opened, and normally communicates the portions 43 and 45 of the bypass passage 44 to one another, via its valve port 57.

The chamber 52 of the idle control valve 50 communicates with one chamber 66 of a pressure regulating valve 68 as the constant vacuum source through a vacuum passage 67. The pressure regulating valve 68 is separated into two chambers 66 and 70 by a diaphragm 72. The chamber 66 of the pressure regulating valve 68 is also communicated with the intake manifold 32, so as to introduce vacuum from the intake manifold 32 thereinto, through a passage 74. The chamber 70 is open to the atmosphere in a per se well known manner. To the diaphragm 72 is secured a valve member 76 which is opposed to a valve seat 78 provided at the end of the passage 74. In the chambers 66 and 70 there are respectively disposed helical compression coil springs 71 and 73. The springs 71 and 73 are generally of equal spring pressure in a position in which the diaphragm 72 is in neutral position. It will be noted that, though it is not so shown, the chamber 66 can also be connected with a exhaust-gas recirculation (EGR) control valve which recirculates a part of the exhaust gases flowing through an exhaust passage 80 to the intake manifold 32.

The diaphragm 72 is moved upwards or downwards by change of the balance of the vacuum in the chamber 66 and the atmospheric pressure introduced into the chamber 70. By this moving of the diaphragm 72, the valve member 76 is moved toward or away from the valve seat 78, so as to regulate a reference vacuum for the idle control valve 50. The reference vacuum regurated in the pressure regurating valve means 68 is introduced to the chamber 52 of the idle adjusting valve means 50 through the vaccum passage 67 with an orifice 69. The orifice 69 restricts varying of vacuum flowing into the chamber 52 so as to smooth the valve operation.

The chamber 52 of the idle control valve 50 is further communicated with a chamber 82 of an intake air valve 84 through an air passage 81. The intake air valve means 84 is divided into two chambers 82 and 86 by a diaphragm 88. The chamber 82 is also communicated with the air intake passage 20 upstream of the throttle valve 30 through a passage 90. An electromagnetic actuator 92 is disposed within the chamber 86 and is electrically operated in response to a train of pulse signals generated based on a control signal from the control signal generator in a hereinafter described control unit in use with a microcomputer. On the diaphragm 88 is provided a valve member 94 which is electromagnetically moved by the actuator 92. In practice, by varying the pulse width based on the control signal, the ratio of the energized period and deenergized period of the actuator 92 is varied. Therefore the ratio of the opening period and the closing period of the valve 94 is varied so as to control the flow rate of the air flowing through the intake air valve 84. In the chamber 86 is further provided a helical compression coil spring 96 which biases the diaphragm together with the valve member 94 toward the end of the passage 90, so as to seat the valve member 94 onto a valve seat 98 provided at the end of the passage 90. By the vacuum from the pressure regulating valve 68, the diaphragm 56 together with the valve element 58 is moved to control the flow of air through the bypass passage 44. The vacuum in the chamber 52 is controlled by the flow rate of the air through the intake air valve 84 and the air passage 81.

When the internal combustion engine 10 is in idling condition, the throttle valve 30 is generally closed so as to ristrict the flow of intake air therethrough. Therefore, during idling condition of the internal combustion engine 10, the intake air substantially flows through both the idle port passage 36 and the bypass passage 44, which bypasses the throttle valve 30 and connects together portions upstream and the downstream of the throttle valve 30. Air flow rate through the idle port passage 36 is adjusted by the idle adjusting screw 42, and the air flow rate through the bypass passage 44 is generally controlled by the idle control valve 50. The idle control valve 50 is operated by vacuum fed from the intake manifold 32 through the passage 74, the pressure regulating valve 68, and the vacuum passage 67. The vacuum in the chamber 52 is adjusted by the atmospheric intake air flowing thereinto through the passage 90, the electromagnetic valve 84 and the passage 81. The valve element 58 is operated to control the air flow rate flowing through the passage 44 by the vacuum within the chamber 52. Since the engine speed depends on the intake air flow rate, it can thus be controlled by controlling the air flow rate through the idle port passage 36 and the bypass passage 44 when the internal combustion engine 10 is in idling condition.

It should be noted that, though the control operation for adjusting the intake air flow rate performed by controlling the electromagnetic actuator 92 is described hereafter, the controlling of air flow rate, and thus the control of engine speed during idling condition of the internal combustion engine 10, can also be carried out by controlling the idle adjusting screw 42. Although it is not specifically so shown in FIG. 1, the idle adjusting screw 42 is controlled by an actuator which is electrically operated in response to control actuating signals fed from the microcomputer described hereinafter. The actuating signals are generated based on the control signals.

Now, returning to FIG. 1, a microcomputer 100, employed for automatically controlling the air flow rate, comprises generally a central processing unit (CPU) 102, a memory unit 104, and an input/output unit 106 i.e. an interface. As inputs of the microcomputer 100, there are various sensor signals, such as:

a crank pulse and a crank standard pulse, the crank pulse being generated at every one degree or certain degree more than one of the crank angle, and the crank standard pulse being generated at every given crank standard angle by a crank angle sensor 110 detecting the amount of rotation of a crank shaft 112; the crank pulse and the crank standard pulse are inputted as an input indicating engine speed and engine crank position;

a coolant temperature signal, produced by a temperature sensor 114 which is inserted into a coolant passage 116 provided around the engine cylinder 12, and exposed to the coolant 118; the temperature sensor 114 generates an analog signal in response to the coolant temperature and feeds this signal to the input/output unit 106 through an analog-digital converter (A/D converter) 120, in which the coolant temperature signal is converted into a digital code a binary number signal, which is suitable as an input for the microcomputer.

a throttle valve angle signal, derived from an analog signal produced by a throttle valve angle sensor 112 which comprises a variable resistor 124 and converted into digital code by an A/D converter 126, a signal from a transmission neutral switch 128, which is inputted in the form of an ON/OFF signal, a vehicle speed signal, fed from a vehicle speed sensor 130, which is an ON/OFF signal which becomes ON when the vehicle speed is lower than a given speed, e.g., 8 kph, and is OFF otherwise, and a battery voltage signal, fed from the battery 127 through the A/D converter 129.

It will be appreciated that, although, in the shown embodiment, there is employed a variable resistor 124 in the throttle valve angle sensor 122 for detecting the closed position of the throttle valve, an ON/OFF switch could substitute for the variable register 124, which could become ON when the throttle valve 30 is closed.

Figure 2:
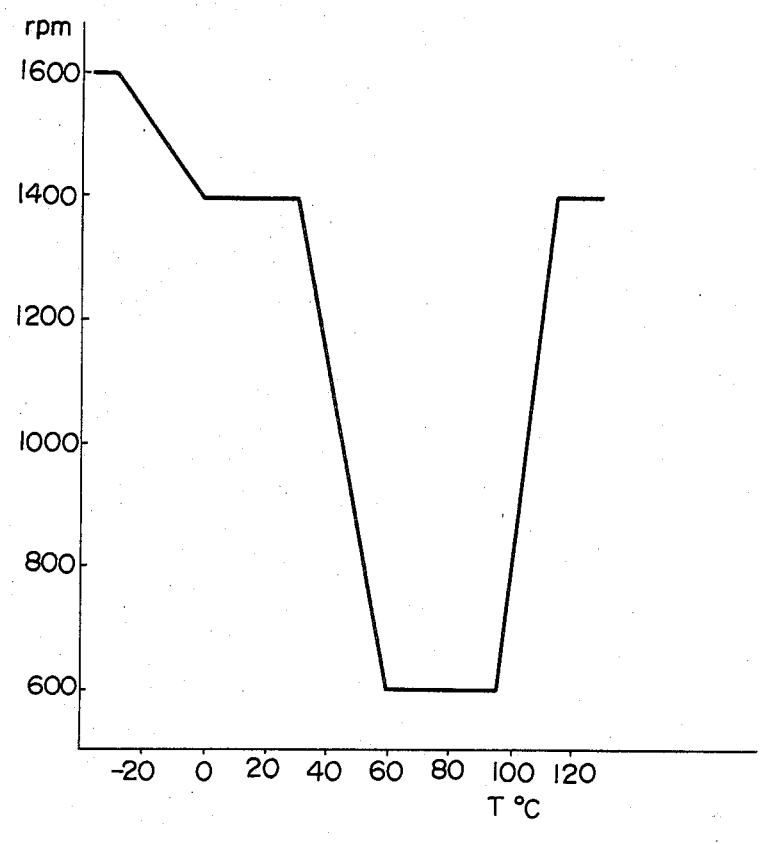
FIG. 2 is a graph showing varying of a reference engine speed corresponding to coolant temperature.

FIG. 2 shows a relationship between the coolant temperature T and the reference engine speed $N_{SET}$, as an example of control characteristics, under open-loop control, according to the present invention. The reference engine speed $N_{SET}$ is the desirable engine speed corresponding to the coolant temperature. The pulse duty of the pulse signal applied to the actuator 92 is determined based on the control signal which corresponds to the reference engine speed $N_{SET}$ in open-loop control. Although the control characteristics according to the present invention is described hereafter with respect to an example using the coolant temperature as a control parameter to determine the desired reference engine speed $N_{SET}$, it will be possible to use other factors as the control parameter. For example, engine temperature can also be used as the control parameter for determining the reference engine speed $N_{SET}$.

As shown in FIG. 2, according to the present invention, in a normal driving condition in which the coolant is warmed-up to 60° C. to 95° C., the idling engine speed is maintained at 600 r.p.m. When the coolant temperature is higher than the abovementioned normal range and is thereby over-heated, the reference idling engine speed is increased to the maximum 1400 r.p.m. so as to increase coolant velocity and to increase the amount of cooling air passing a radiator (not shown) for effectively cooling the internal combustion engine. On the other hand, if the coolant temperature is lower than that of the normal range, the reference idling speed is also increased to the maximum 1600 r.p.m. so as to warm-up the engine rapidly and to stabilize idling engine speed in the cold engine condition. One of the most important concepts of the present invention is to specify the reference engine speed at a specific cold temperature of the coolant. According to the present invention, the specific temperature range is 0° C. to 30° C. and the specific reference engine speed in the specific temperature range is 1400 r.p.m. The specific reference engine speed is kept constant within the above-mentioned specific temperature range. The reason for specifying the coolant temperature range and constant engine speed within this range is that, except in extraordinarily cold weather, the coolant temperature is normally in this range when the engine is first started.

In practical control operation with a microcomputer, the reference engine speed is determined in either of two ways; i.e., open-loop control and feedback control. In the feedback control, the pulse duty (the ratio of the pulse width to one pulse cycle) of the pulse signal to be fed back to the electro-magnetic valve means 84 is determined based on the control signal which does not correspond to the reference engine speed $N_{SET}$ as in open-loop control and determined according to the difference between the actual engine speed and the reference engine speed. The feedback control is carried out according to the position of the throttle valve detected or measured by the throttle valve angle sensor 122, the position of the transmission detected by the neutral switch 128, the vehicle speed detected by the vehicle speed switch sensor 130 and so on. In any case, the feedback control to be carried out will be determined with reference to vehicle driving conditions which will be preset in the microcomputer, for example the condition in which the throttle valve is closed and the transmission is in neutral position or the condition in which the throttle valve is closed and the vehicle speed is below 8 km/h. When the vehicle driving condition is not adapted to carry out feedback control, then the microcomputer performs open loop control by table look-up. In open loop control, the reference engine speed $N_{SET}$, i.e. the control signal, is determined with reference to the coolant temperature by table look-up. As apparent from the above, the control signal is the signal which determines the pulse duty of the pulse signal.

The table data is stored in the ROM of the memory unit 104. The table data is looked-up according to the coolant temperature. The following table shows the relationship between the coolant temperature (TW) and corresponding reference engine speed $N_{SET}$, when the table is preset in 32 bytes of ROM.

TABLE

| Coolant temperature TW (°C.) | Reference engine speed $N_{SET}$ (rpm) | Coolant temperature TW | Reference engine speed $N_{SET}$ |
|---|---|---|---|
| 117 and over | 1400 | 36.5 | 1225 |
| 104 | 1000 | 33 | 1325 |
| 94 | 600 | 29.5 | 1400 |
| 80 | 600 | 22 | 1400 |
| 59.5 | 600 | 10 | 1400 |
| 55.5 | 725 | 1 | 1400 |
| 51.5 | 837.5 | −4 | 1425 |
| 47.5 | 937.5 | 10.5 | 1475 |
| 43.5 | 1012.5 | 18.5 | 1525 |

TABLE-continued

| Coolant temperature TW (°C.) | Reference engine speed $N_{SET}$ (rpm) | Coolant temperature TW | Reference engine speed $N_{SET}$ |
|---|---|---|---|
| 40.5 | 1100 | −30 and less | 1600 |

It should be appreciated that in the example shown, the engine speed is increased in steps of 12.5 r.p.m. If the coolant temperature is intermediate between two given values, the reference engine speed $N_{SET}$ will be determined by interpolation.

Figure 3:
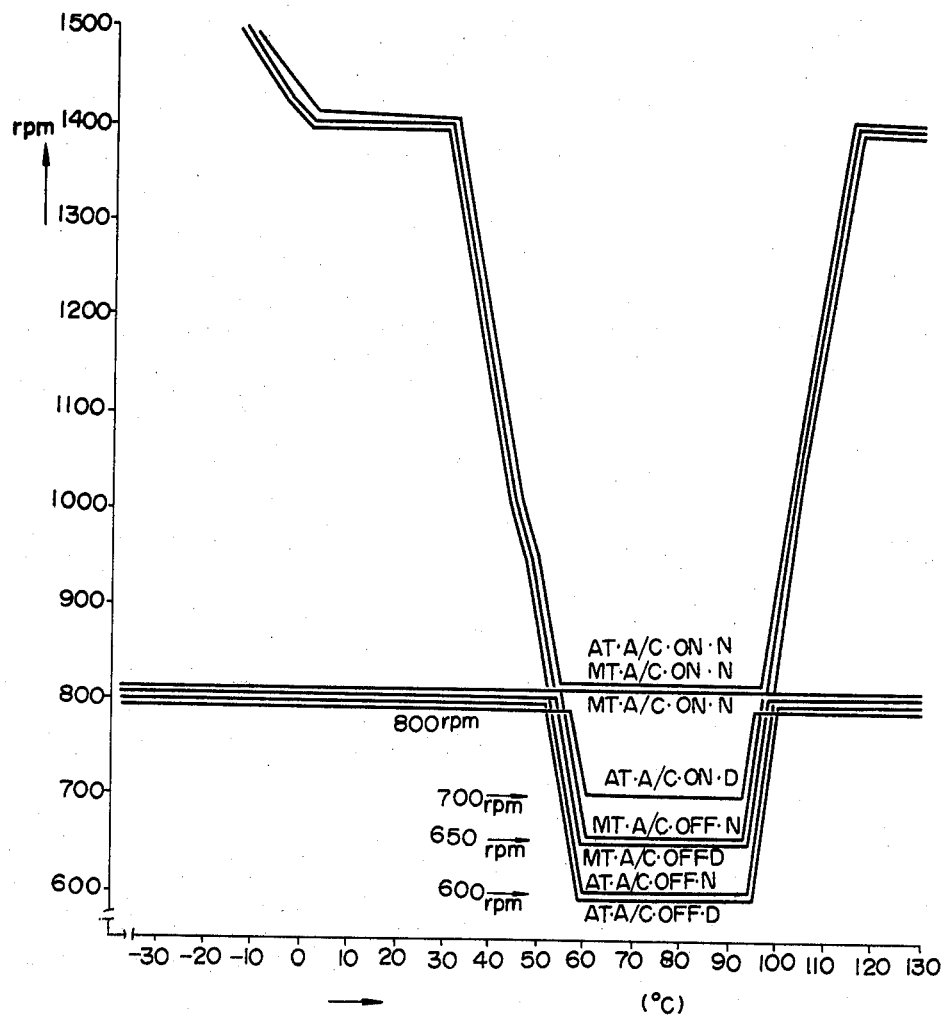
Figure 4:
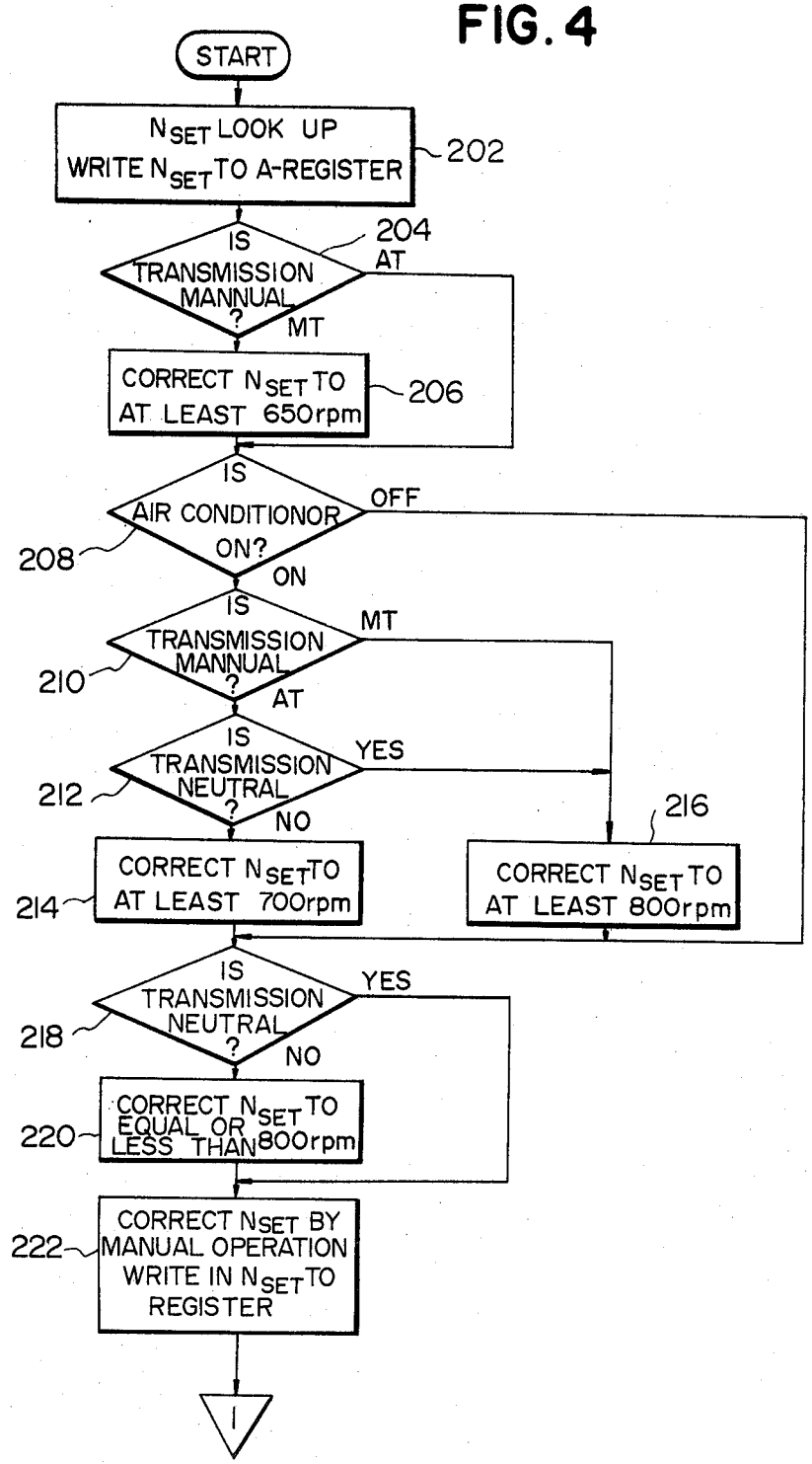
FIG. 4 is a flowchart of a program for correcting the reference engine speed with respect to whether the transmission is in drive or neutral, kind of transmission and whether the air conditioner is operating.
Figure 5:
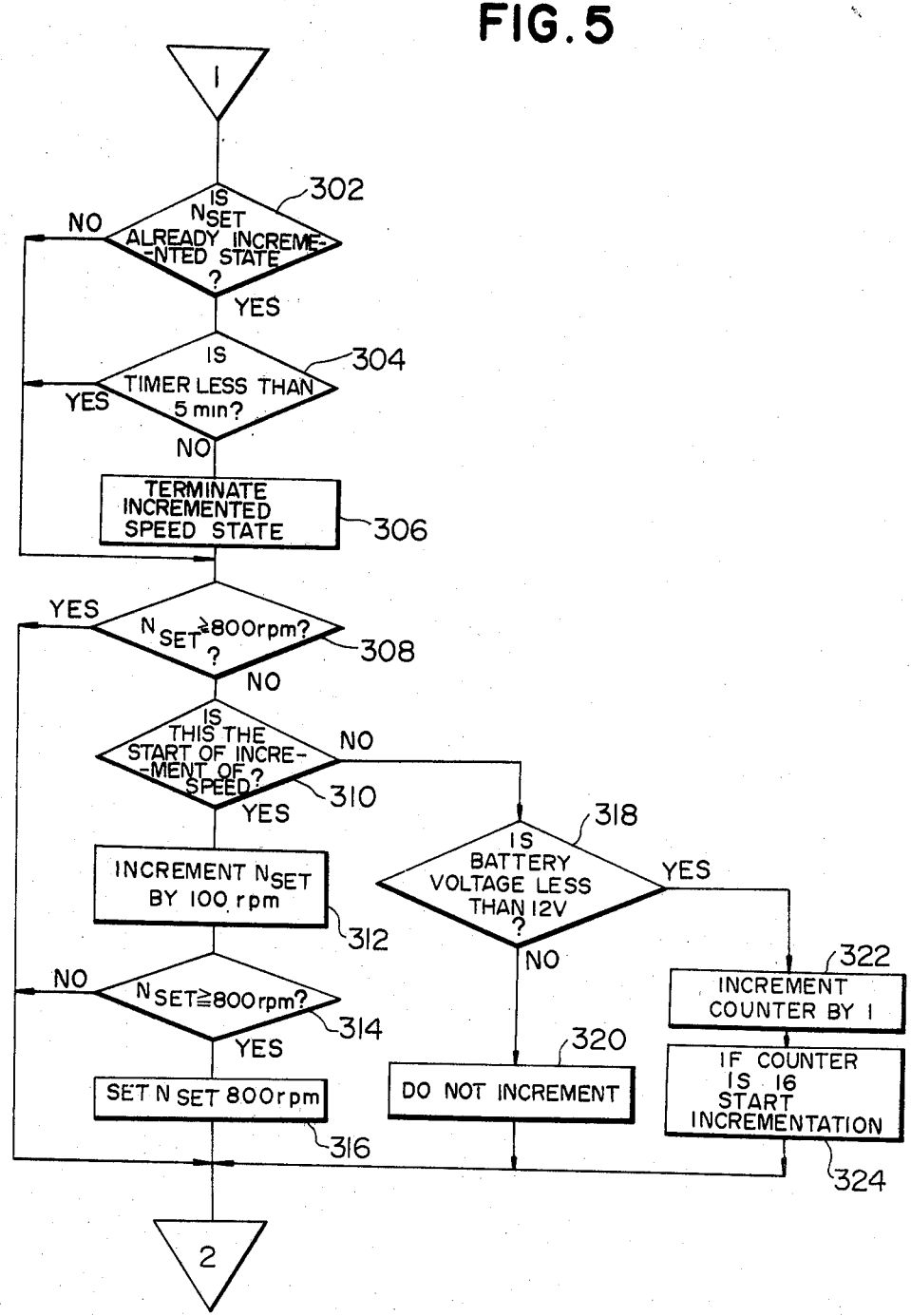
FIG. 5 is a flowchart of a program for correcting the reference engine speed in response to a drop in the vehicle battery voltage.

The control signal determined, in open-loop control, by table look up of the above-mentioned table corresponding to the coolant temperature should be further corrected with respect to kind of transmission, battery voltage, and operating condition of air conditioner. Namely, the load applied to the internal combustion engine is varied depending on the kind of transmission. Further, in the case of a manual transmission, the load applied to the engine when the clutch is engaged is greater than that of an automatic transmission so that it requires higher engine speed. On the other hand, when the battery voltage goes below, for example, 12 volts, it is necessary to recharge the battery rapidly to increase the voltage. For this, the idling engine speed will be increased. Further, when the air conditioner is on, engine load will be increased for operating the same. FIGS. 3 to 5 illustrate ways for performing corrections of the control signal with respect to kind of transmission, operating condition of the air conditioner and the battery voltage.

FIG. 3 shows various curves of variation of the reference engine speed $N_{SET}$ corresponding to the coolant temperature. The curves shown in FIG. 3 are modified ones to the curve shown in FIG. 2 which shows the basic reference engine speed $N_{SET}$ determined according to the coolant temperature. The "AT A/C OFF N" indicates a vehicle condition in which the power transmission used in the vehicle is an automatic transmission (AT); the air-conditioner (A/C) is turned off and transmission is in the neutral position (N). The curve identified by "AT A/C DEF N" shows the basic reference engine speed curve. The other curves respectively show corrected reference idling engine speed $N_{SET}$ with respect to kind of transmission, operating condition of the air-conditioner and the position of the transmission.

When a manual transmission (MT) is used in the vehicle, the minimum reference engine speed is increased by 50 r.p.m. to 650 r.p.m., as in such a case, the load applied to the engine is increased compared to that of the automatic transmission. Further, when the automatic transmission (AT) is in a drive range (D) and therefore the neutral switch is off, the maximum reference engine speed $N_{SET}$ is set to 800 r.p.m. instead of corresponding to the coolant temperature so as to prevent the vehicle from creeping. On the other hand, in a manual transmission (MT), the maximum reference engine speed $N_{SET}$ is set to 800 r.p.m. In general when the manual transmission is in a drive range, for preventing exessively increasing control values of the control signals of feedback control depending on momentary decreasing of engine speed when the clutch is applied to engage, it is required to limit the maximum engine speed. When the transmission is in neutral position (N), for rapidly warming-up the engine in cold engine condition, or for rapidly radiating engine heat temperature in over-heated condition, the reference engine speed is varied corresponding to the coolant temperature.

With respect to the operating condition of the air conditioner, the reference engine speed $N_{SET}$ is generally increased to more than 800 r.p.m. for effectively operating the air conditioner in the operating position (N). However, for an automatic transmission (AT) in the drive range (D), the reference engine speed $N_{SET}$ is normally set to 700 r.p.m. and is set to a maximum 800 r.p.m. for preventing the vehicle from creeping.

According to the above-explained basic point of correction for the basic reference engine speed $N_{SET}$, the reference engine speed is corrected according to the following table II:

TABLE II

| Air conditioner (A/C) | Automatic transmission (AT) | | Manual transmission (MT) | |
|---|---|---|---|---|
| | drive (r.p.m.) | neutral (r.p.m.) | drive (r.p.m.) | neutral (r.p.m.) |
| on | $N_{SET} \leq 800$ $\geq 700$ | $N_{SET} \leq 800$ | $N_{SET} = 800$ | $N_{SET} \geq 800$ |
| off | $\leq 800$ | $\geq 600$ | $\leq 800$ $\geq 650$ | $\geq 650$ |

In the table II, the "drive range" means first speed, second speed, drive and reverse range in the automatic transmission and first to fifth speed and reverse gear in the manual transmission, and the "neutral range" means park range and neutral in both the automatic and manual transmissions.

It should be noted that, in FIG. 3, for the purpose of clear indication of each curve of variation of the basic reference engine speed corresponding to the coolant temperature independently, lines which have the same values at least in part are separated from each other.

Referring to FIG. 4, in open-loop control, there is illustrated a flowchart of a correction program to be executed for correcting the basic reference engine speed $N_{SET}$ with respect to type of transmission, drive or neutral range of the transmission and whether the air conditioner is on or off. At first, in a processing block 202, the table data set in the ROM according to the characteristics of the basic reference engine speed $N_{SET}$ shown in FIG. 2, is read out according to the coolant temperature signal fed from the coolant temperature sensor 114 of FIG. 1. The reference engine speed $N_{SET}$ determined by the table look-up is written in register A. Thereafter, in a decision block 204, the transmission type is checked as to whether the transmission is of manual type. If the transmission is manual, the reference engine speed $N_{SET}$ stored in register A is corrected at a processing block 206 as follows: when the reference speed $N_{SET}$ is less than 600 r.p.m., it is corrected to 650 r.p.m. When the transmission is of automatic type, the process jumps to a decision block 208. The process also skips to the decision block 208 after operation at the processing block 206 when the transmission type is manual. Decision block 208 checks if the air-conditioner is on. If the air conditioner is on, decision block 210 checks again whether the transmission type is manual. If so, and if the reference engine speed stored in register A is less than 800 r.p.m., it is corrected to 800 r.p.m. in a processing block 216. On the other hand, when the transmission type is automatic, the operating position of the transmission is checked to determine whether it is in neutral range, in a decision block 212. If so, control skips to the processing block 216. Otherwise, if the reference engine speed $N_{SET}$ stored in register A is less than 700 r.p.m., it is corrected to 700 r.p.m. at a processing block 214. After correcting the reference engine speed $N_{SET}$ in processing blocks 214 and 216 or when the air conditioner is to be off in the decision block 208, a decision block 218 checks whether the transmission is in neutral range. When the transmission is in neutral range, control jumps to a processing block 222. In the processing block 222, the reference engine speed $N_{SET}$ is manually corrected in steps of 50 r.p.m. The manual correction input is obtained from an external input terminal. The method of manually correcting the reference engine speed $N_{SET}$ will be described in detail below with reference to FIGS. 8(A) and 8(B).

Meanwhile, when the voltage of the vehicle battery drops, it is necessary to recharge the battery. For rapidly recharging the vehicle battery, it will be preferable to temporarily increase engine idling speed. Actually, when the battery voltage drops below 12 volts, the engine idling speed is incremented. It will be preferable to increment the engine idling speed when the batery voltage stays below 12 volts for a given period. FIG. 5 shows a flowchart of a program to be executed in response to a drop in the battery voltage.

Referring to FIG. 5, there is shown flowchart of a program for incrementing the engine speed in response to a drop in battery voltage. In the embodiment shown, the program is executed to increment the engine idling speed when the battery voltage stays below 12 volts for six executions of the program. When the idling engine speed is incremented, the reference engine speed $N_{SET}$ is increased by steps of 100 r.p.m. in a range not to exceed 800 r.p.m. For convenience of following explanation and for better understanding of the description, here explanation is started at a decision block 318 which checks whether the battery voltage is more than 12 volts. When the battery voltage is more than 12 volts, instruction not to increment the engine speed is made in a processing block 320. If the battery voltage is less than 12 volts, a counter is increased by one in a processing block 322. The counter value is checked as to whether it is 16, and when the counter value becomes 16 an instruction to increment the reference engine speed $N_{SET}$ is issued in processing block 324. After the increment instruction is issued, it is preferable to reset the value of the counter to zero. When the increment instruction is issued, the engine speed is checked in a decision block 302 as to whether it has already been increased. If not, a timer starts to measure the time interval at the same time the engine idling speed begins to be increased and control jumps to a decision block 308. When the engine speed is increased and the decision of the decision block 302 is YES, at a decision block 304 the time interval measured by the timer is checked to determine whether increased engine idling speed has been maintained for a given period of time, for example, five minutes. If not, the process jumps to a decision block 308. In the decision block 308, the reference engine speed $N_{SET}$ which is stored in register A, is checked as to whether it exceeds 800 r.p.m.

Since it is unnecessary to increase the engine speed when the reference engine speed $N_{SET}$ exceeds 800 r.p.m., if the decision of the decision step 308 is YES, the process jumps to end. When the decision of the decision block 308 is NO, then the reference engine speed $N_{SET}$ stored in register A is increased by 100 r.p.m. in a processing block 312. The increased engine speed $N_{SET}$ is checked in a decision block 314 as to whether it exceeds 800 r.p.m. If the increased engine speed $N_{SET}$ exceeds 800 r.p.m., the engine speed $N_{SET}$ is corrected to 800 r.p.m. in a processing block 316. On the other hand, when the increased engine speed $N_{SET}$ is less than 800 r.p.m., the process jumps to end. Meanwhile, if at both the block 304 and the block 314, the decisions are YES, i.e., increased engine speed has been maintained for more than five minutes, in a process block 306, the increment of engine idling speed is ended, to return to the previously set reference speed. Further, if the engine speed $N_{SET}$ is already increased at the decision block 310, the process jumps to a decision block 318 to check the battery voltage.

By the above-mentioned program to be executed in response to a drop in the battery voltage, the acceleration of idling engine speed is carried out when the battery voltage is maintained for a given period of time. Thereby, if the battery voltage drops momentarily, the engine idling speed is not incremented so as avoid responding to such a temporary voltage drop which may be caused by operating vehicle devices. Further, since the program limits the maximum engine idling speed to 800 r.p.m., the vehicle is effectively prevented from creeping.

Figure 6:
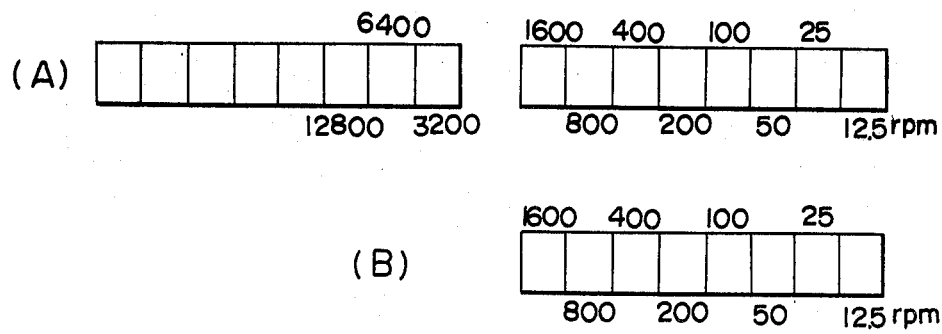
FIG. 6(A) is an explanatory illustration of a register for holding an actual engine speed.
FIG. 6(B) is an explanatory illustration of a register for holding a reference engine speed.
Figure 7:
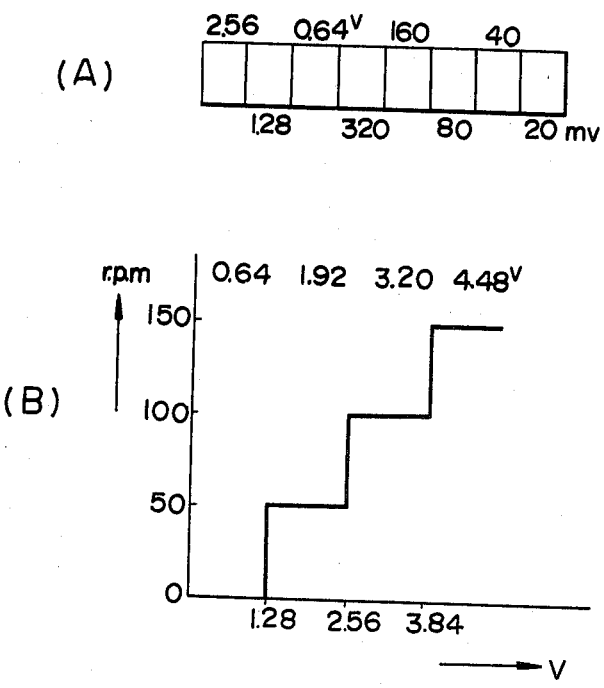
FIG. 7(A) is an explanatory illustration of a register for holding a value of electric voltage to be applied when the reference engine speed is adjusted manually.
FIG. 7(B) is a graph of a relationship between increase of voltage and increase of engine speed.

Now we refer to FIGS. 6(A) and (B) and 7(A) and (B), wherein are illustrated methods of storing a value in a register. In a vehicle with the engine speed manually controlled and having no means for feedback control, the engine idling speed can be adjusted manually. For a feedback controlled internal combustion engine, the control value is to be manually corrected by manual adjustment of engine speed. For manual correction, the control system according to the present invention is provided with an external input terminal ISCV. To the external input terminal ISCV is connected a variable resistor which can be manually adjusted. By adjusting the resistance value of the variable resistor, the input voltage is varied in a range from 0 V to 5 V by which the reference engine speed $N_{SET}$ is adjusted. FIG. 6(A) shows a register for holding actual engine speed $N_{RPM}$. The register capacity is two 8-bit bytes, and the engine speed data is stored as a binary number, which represents a multiple of 12.5 r.p.m. FIG. 6(B) shows a register for holding the reference engine speed $N_{SET}$. The register is of eight bits, one byte to store engine speed data with a maximum value of 3187.5 r.p.m. FIG. 7(A) shows a register IVAR for storing analog-digital converted external input terminal voltage ISCV. The register is of eight bits, one byte which stores the external input terminal voltage in units of twenty millivolts and maximum about five volts. The relationship between the external input voltage and increasing of engine speed will be observed in FIG. 7(B). As shown in FIG. 7(B), the engine speed $N_{SET}$ is increased in steps of 50 r.p.m. In the example shown, the voltages at the top indicate the average voltages in corresponding increased steps of engine speed. It should be noted that although FIG. 7(B) shows respective specific voltages corresponding to respective increased engine speeds, these may vary somewhat because of errors in analog-digital conversion and unevenness of the variable register. To avoid such problems, in the preferred embodiment of the present invention, the analog-digital converted voltage of the external input terminal, as shown in FIG. 8(A), is ANDed with 1100000 in FIG. 8(B). The result is AB0000000, as shown in FIG. 8(C). Then, the result, as shown in FIG. 8(C), is shifted right by four bits to make the value 0000AB00, as shown in FIG. 8(D). Since A and B are binary degits, the value shown in FIG. 8(D) is therefore one of 0100, 1000 and 1100. These correspond respectively to 50 r.p.m., 100 and 150 r.p.m. This value is then added to $N_{SET}$.

The following table shows an example assuming that the external input voltage is 3.2 volts and the reference engine speed $N_{SET}$ is 600 r.p.m. and is to be increased by 100 r.p.m. Here, further assume that the value of register IVAR is 2.8 in Example I and 3.2 in Example II.

TABLE III

| | | Example I(2.8V) | Example II(3.2V) |
|---|---|---|---|
| IVAR | (1) | 10001100 | 10100000 |
| Constant | (2) | 11000000 | 11000000 |
| (1) and (2) | (3) | 10000000 | 10000000 |
| Shift right by 4 bits | (4) | 00001000 | 00001000 |
| $N_{SET}$ | (5) | 00110000 (600 r.p.m.) | 00110000 (600 r.p.m.) |
| (4) and (5) | (6) | 00111000 (700 r.p.m.) | 00111000 (700 r.p.m.) |

Thereby, the logical product of (1) and (2) is not influenced by variation in the setting. Therefore, the increasing of the engine speed $N_{SET}$ can be accurately carried out in units of 50 r.p.m. It will be appreciated, here, as shown in FIG. 8(B), there is an allowable range of variation of measured voltage which can prevent errors in the above mentioned correcting operation.

When feedback control takes place, engine speed is controlled corresponding to the actual engine speed $N_{RPM}$ and a difference $\Delta N$ between the actual engine speed and the reference engine speed. For determining difference $\Delta N$, the reference engine speed $N_{SET}$ is compared with an actual engine speed $N_{RPM}$ determined by the crank angle sensor signal. Thus, the difference $\Delta N$ ($N = N_{RPM} - N_{SET}$) between the reference engine speed $N_{SET}$ and the actual engine speed $N_{RPM}$ is obtained. Corresponding to the difference, $\Delta N$, the microcomputer determines the control signal. The control signal is an output signal of the control signal generator which consists of proportional element and an integral element. The microcomputer further determines the pulse width of the pulse signal for controlling the electromagnetic actuator 92. Thereby, the intake air flow rate in the idling condition of the internal combustion engine in the specific operating condition is controlled so as to match the actual engine speed $N_{RPM}$ with the reference engine speed $N_{SET}$ at an adequate rate.

Figure 9:
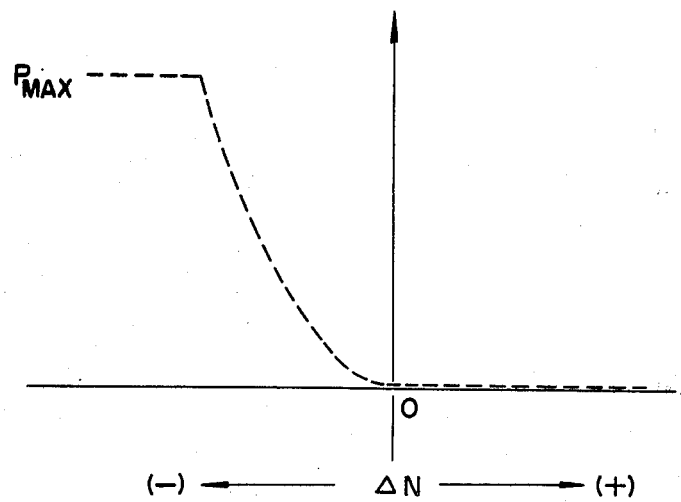
FIG. 9 is a graph showing variation of a proportion constant of a control value.

In the feedback control of the internal combustion engine, the proportional constant of the control signal generator is generally used to vary the changing rate of the control signal i.e. the response characteristics of the feedback control system and the rate of getting the engine speed $N_{RPM}$ equal to the reference engine speed $N_{SET}$. If the proportional constant is too large, and thereby the changing rate of the control signal is excessively high, the pulse duty of the pulse signal applied to the actuator 92 is too frequently varied. It may cause hunting in the feedback control system due to frequent changes in the pulse duty of the control signal controlling the electromagnetic actuator 92. Since the response time period from the time when the intake air flow rate is varied to the time when the engine speed is actually changed is getting shorter with the increase of the engine speed, hunting will occur more frequently in higher engine speed ranges. On the other hand, if the engine speed is slower, the response time period will be rather longer than that is required and thereby possibly cause engine stall. Therefore, according to the present invention, the response characteristics of the feedback control system are improved by decreasing the proportion constant in a range of higher engine speed and increasing it in a range of lower engine speed to compensate for the inherent change of the response time period of the engine. FIG. 9 shows a graph of the setting of the proportional constant with respect to the difference $\Delta N$ in the idling condition of the internal combustion engine, according to the present invention. As will be observed from FIG. 9, to prevent the internal combustion engine from hunting, when the actual engine speed $N_{RPM}$ is higher than reference engine speed $N_{SET}$, and therefore the pulse signal with smaller pulse duty is applied to the actuator 92, the proportional constant is preset to 0. On the other hand, when the actual engine speed $N_{RPM}$ is lower than reference engine speed $N_{SET}$, the proportional constant will be proportional to square of the difference $\Delta N$ of the actual and reference engine speeds. Thereby, stalling will be effectively prevented even when the engine speed is rather slow with respect to the reference speed.

Figure 10:
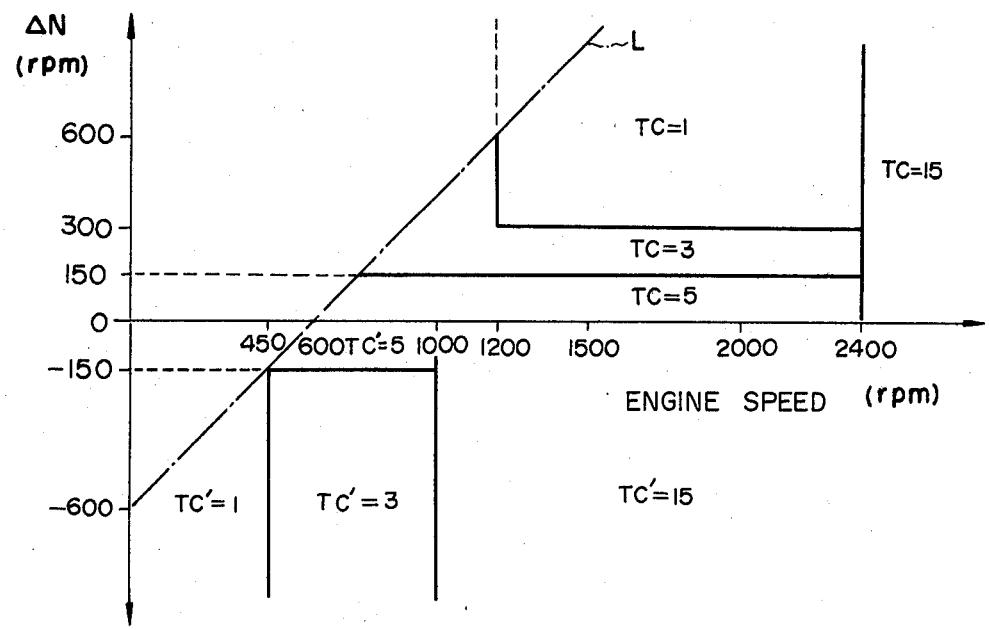
FIG. 10 is a graph showing variation of an integration constant of the control value.

It is also required to vary an integral constant of the control signal generator in order to adjust the changing rate of the control signal depending on the difference $\Delta N$ and the actual engine speed $N_{RPM}$. FIG. 10 shows characteristics of the integral constant. In FIG. 10, TC and TC' denote the time constants of the integral element of the control signal generator. The output of the integral element of the control signal generator increases or decreases at the rate of 0.5%, for example, of the output of the integral element per the number of TC' or TC respectvely. For example TC=1 indicates that the output is decreased by 0.5% of the output per one engine revolution and TC'=15 indicates that the output is increased by 0.5% of the output every 15 engine revolutions. For preventing the internal combustion engine from hunting, the number of TC is increased corresponding to an increase of actual engine speed and to a decrease in the difference $\Delta N$ of the actual and reference engine speeds. The number of TC' is increased corresponding to the increase of the actual engine speed and to the decrease of the absolute value of the difference $\Delta N$.

It will be noted that, in FIG. 10, the region to the left side of the chained line (L) is a blank space which will not occur during actual operation of the internal combustion engine, if the idling speed is set at 600 r.p.m. It should be further noted that when the engine speed is below 1200 r.p.m., the TC=3 range is extended to higher values of $\Delta N$ to prevent engine stalling, which is easily caused by rapidly decreasing the engine speed in this range. Further, although the above-mentioned FIGS. 9 and 10 show characteristics of the proportional constant and integral constant which are not varied linearly, it is possible to vary the constants approximately linearly.

Figure 11:
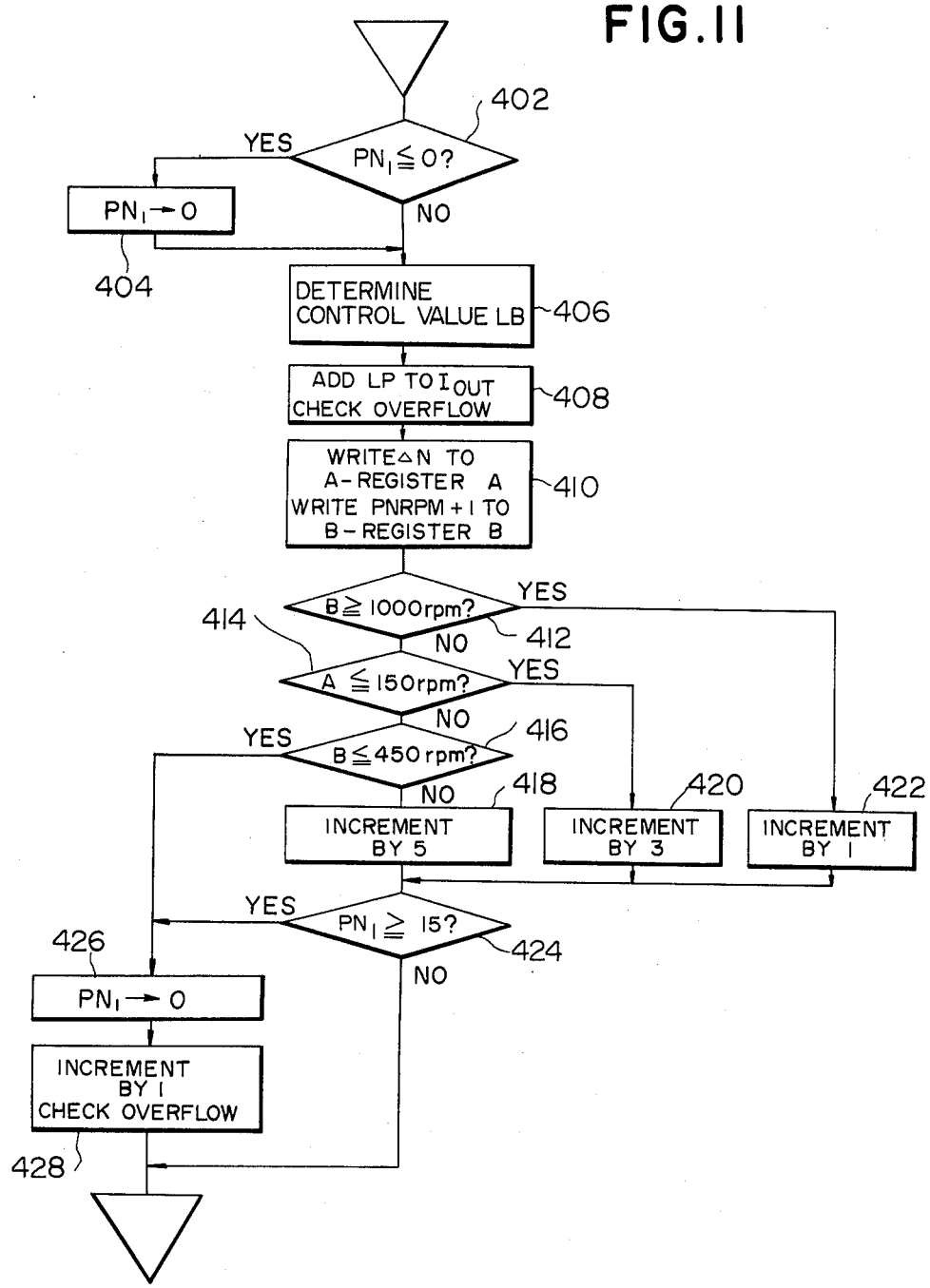
FIG. 11 is a flowchart of a program for correcting the control value to be executed when the reference engine speed is higher than the actual engine speed.
Figure 12:
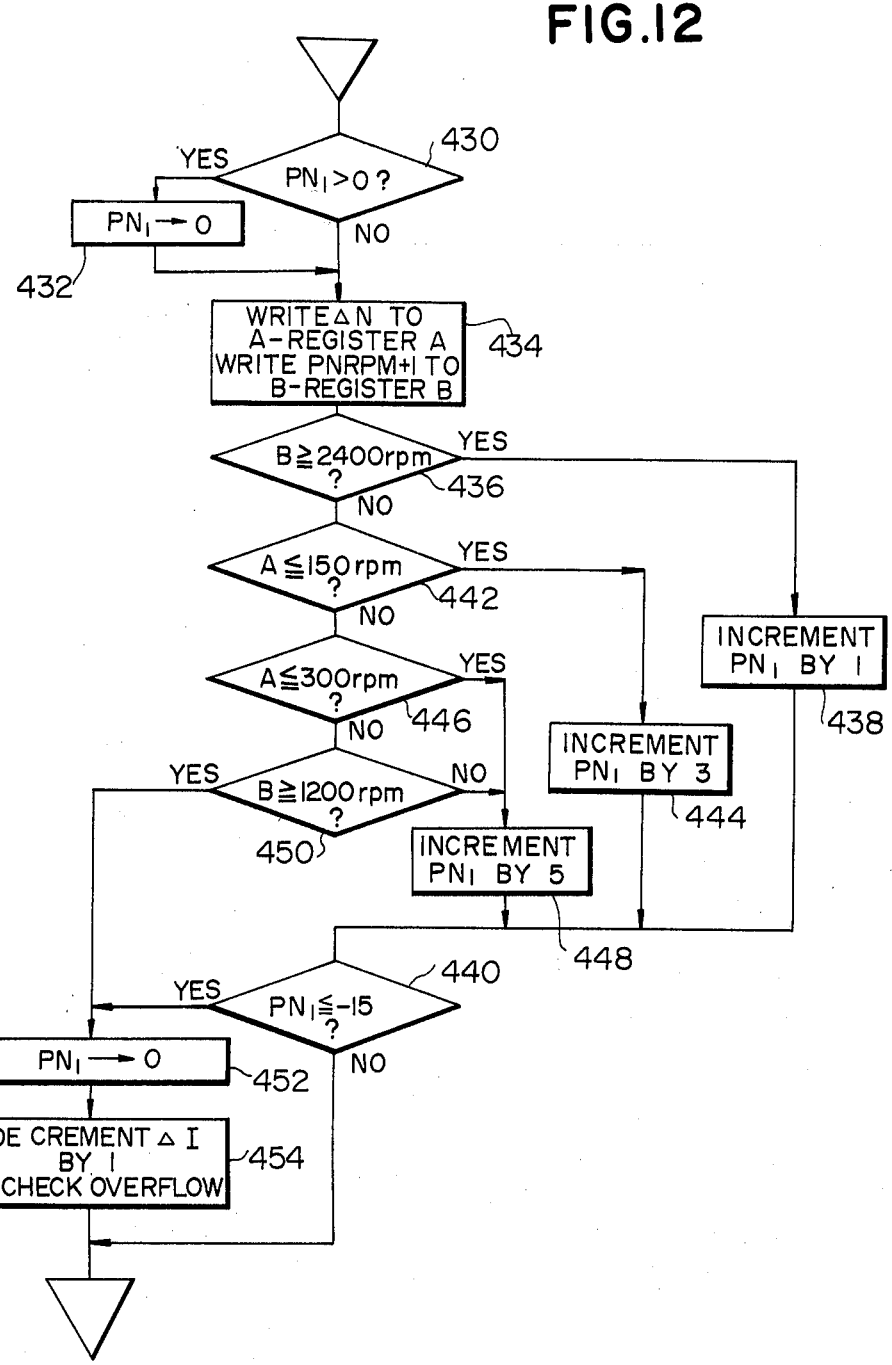
FIG. 12 is a flowchart of a program for correcting the control value to be executed when the actual engine speed is higher than the reference engine speed.

Referring now to FIGS. 11 and 12, there are shown flowcharts of programs which are executed to determine the integral constant with respect to the difference $\Delta N$ and the actual engine speed $N_{RPM}$. FIG. 11 shows a flowchart to be executed to determine integration constant when the actual engine speed $N_{RPM}$ is lower than the reference engine speed $N_{SET}$ and FIG. 12 shows a flowchart to be executed when the actual engine speed $N_{RPM}$ is higher than the reference speed $N_{SET}$. When the microcomputer operates to determine the integral constant with respect to the difference N and the actual engine speed $N_{RPM}$, at first the microcomputer checks whether the actual engine speed $N_{RPM}$ is higher or lower than the reference engine speed $N_{SET}$ and then the program to be executed is selected.

Meanwhile, in a computer controlled engine control system, a value $ISC_{ON}$ of the control signal for the internal combustion engine when idling is determined from the following formula:

$$ISC_{ON} = ISC_{TW} + ISC_{AT} + ISC_{TR} + ISC_{AS} + ISC_{CL} \text{(Formula I)}$$

where $SC_{TW}$ is a basic control value of the control signal depending on engine temperature;

$ISC_{AT}$ is a value for correction for automatic transmission;

$ISC_{TR}$ and $ISC_{AS}$ are correction values for acceleration and deceleration respectively of the engine; and $ISC_{CL}$ is a correction value for feedback control.

Referring to FIG. 11, the program for determining correction value $ISC_{CL}$ by feedback control is executed for every engine revolution if the actual engine speed $N_{RPM}$ is lower than the reference speed $N_{SET}$. In the decision block 402, the value of counter $PN_1$ is checked as to whether the value $PN_1$ is smaller than or equal to zero. The value $PN_1$ of counter is smaller than or equal to zero when the actual engine speed $N_{RPM}$ is higher than the reference speed $N_{SET}$. Therefore, if the value $PN_1$ of the counter is smaller than or equal to zero, the value of counter $PN_1$ is reset to zero in block 404. After clearing the value of counter $PN_1$ in the processing block 404 or when the value $PN_1$ is larger than zero, an output of the proportional element of the control signal generator is calculated in a processing block 406. The calculation for obtaining the proportional constant is performed and the difference $\Delta N$ is multiplied by the proportional constant as shown in FIG. 9, for example and then the output of the proportional element (LP) is obtained. Thereafter, to the output value LP obtained at the processing block 406 is added the sum of control value $I_{OUT}$ ($=ISC_{TW}+ISC_{AT}+ISC_{TR}+ISC_{AC}$) other than control value $ISC_{CL}$ of the feedback control at a processing block 408. After adding the control value $I_{OUT}$ to the output value LP, overflow checking is carried out with respect to the sum (LP+$I_{OUT}$) obtained. In a processing block 410, the difference N between the actual engine speed $N_{RPM}$ and the reference engine speed $N_{SET}$ is stored in register A. Also in the processing block 410, the actual engine speed $N_{RPM}$ stored in an input register PNRPM+1 is stored in register B. A decision step 412, the actual engine speed $N_{RPM}$ is higher than 1000 r.p.m. If the actual engine speed $N_{RPM}$ is higher than 1000 r.p.m., control jumps to a processing block 422, and otherwise, to a decision block 414. In the processing block 422, the value of counter $PN_1$ is incremented by 1. Decision block 414 checks if the difference $\Delta N$ stored in register A is lower than 150 r.p.m. If the difference $\Delta N$ is larger than 150 r.p.m, control jumps to a process block 420 in which value of counter $PN_1$ is incremented by 3, and otherwise to a decision block 416. The decision block 416 checks if the actual engine speed $N_{RPM}$ stored in register B is lower than 450 r.p.m. When the actual engine speed $N_{RPM}$ is lower than 450 r.p.m, control jumps to a processing block 426 and otherwise, to a processing block 418. In the processing block 426, the value of counter $PN_1$ is cleared to 0. In processing block 418, the value of counter $PN_1$ is incremented by 5. The value of counter $PN_1$ incremented in blocks 418, 420 or 422 is checked to see if the value of $PN_1$ is 15 or more at a decision block 424. If the value $PN_1$ is 15 or more, then control skips to the processing block 426. Otherwise, control jumps to program end. When the actual engine speed $N_{RPM}$ is lower than 450 r.p.m or the counter value $PN_1$ is 15 or more, after clearing the counter value $PN_1$ to 0 at the processing block 426, the value ($\Delta I$) of a correcting counter, which corresponds to the output of the integral element, is incremented by 1 to increment the output of the integral element by 0.5% per increment of 1 and thereafter overflow checking is carried out in a processing block 428.

When the actual engine speed $N_{RPM}$ is lower than 450 r.p.m. and the absolute value of the difference $\Delta N$ of the actual angine speed $N_{RPM}$ and the reference engine speed $N_{SET}$ is higher than 150 r.p.m, i.e. when engine speed is in the area T'=1 of FIG. 10, the value of the correcting counter $\Delta I$ is incremented by 1 per engine revolution. When the actual engine speed $N_{RPM}$ is greater than or equal to 450 r.p.m. but lower than 1000 r.p.m. and the absolute value of the difference $\Delta N$ of the actual engine speed $N_{RPM}$ and the reference engine speed $N_{SET}$ is higher than 150 r.p.m., i.e., the engine speed is in the area T'=3 of FIG. 10, the value of the correcting counter $\Delta I$ is increased by one every 3 engine revolutions. When the actual speed $N_{RPM}$ is lower than 1000 r.p.m. and the absolute value of the difference $\Delta N$ is also lower than 150 r.p.m., i.e., the engine speed is in the area T'32 5 of FIG. 10, the value of the correcting counter $\Delta I$ is increment by 1 every five engine revolutions. Further, when the actual engine speed $N_{RPM}$ exceeds 1000 r.p.m., i.e., engine speed is in area T'=15 of FIG. 10, the value of the correcting counter $\Delta i$ is increased by 1 every 15 engine revolutions. As mentioned before, for every increment of 1 in the value of the correcting counter $\Delta I$, the correction value $LSC_{CL}$ is incremented by 0.5% of the output of the integral element.

Referring to FIG. 12, there is illustrated a flowchart of a program for determining the correction value $ISC_{CL}$ by feedback control when the actual engine speed $N_{RPM}$ is higher than the reference engine speed $N_{SET}$. This program is executed for every engine revolution. First, the value of counter $PN_1$ is checked to see if it is larger than 0 in a decision block 430. If the value of the counter $PN_1$ is larger than 0, the value $PN_1$ is cleared or reset to 0 at a processing block 432. After setting the value of the counter $PN_1$ to 0 or when the value of counter $PN_1$ is less than or equal to 0, the difference $\Delta N$ of the actual engine speed $N_{RPM}$ and the reference engine speed $N_{SET}$ is registered in the register A and the actual engine speed $N_{RPM}$ registered in the input register PNRPM+1 is written in register B, at a processing block 434. Thereafter, the actual engine speed data registered in register B is read and checked whether it is higher than 2400 r.p.m. at a decision block 436. When the actual engine speed $N_{RPM}$ exceeds 2400 r.p.m., the counter value $PN_1$ is decremented by 1 at a processing block 438 and fed to a decision block 440 to be checked whether the counter value $PN_1$ is equal or less than $-15$. If the actual engine speed $N_{RPM}$ is lower than 2400 r.p.m., the difference $\Delta N$ registered in the register A is read and checked whether the difference $\Delta N$ is lower than 150 r.p.m. at a decision block 442. If so, the counter value $PN_1$ is decremented by 3 at a processing block 444. Thereafter, the counter value $PN_1$ is checked whether it is less than $-15$ at the decision block 440. When the difference $\Delta N$ exceeds 150 r.p.m., the difference $\Delta N$ is further determined whether it is lower than 300 r.p.m. at a decision block 446. If so, the counter value $PN_1$ is decremented by 5 at a processing block 448 to be checked whether the counter value $PN_1$ is less than $-15$ at the decision block 440. When the difference N exceeds 300 r.p.m., then the actual engine speed $N_{RPM}$ is checked again whether it exceeds 1200 at a decision block 450. If the actual engine speed $N_{RPM}$ is lower than 1200 r.p.m., the counter value $PN_1$ is decremented by 5 at the processing block 448. If the actual engine speed $N_{RPM}$ is higher than or equal to 1200 rpm, the counter value $PN_1$ is reset to zero at a processing block 452. If the value $PN_1$ is equal to or less than $-15$ at the decision block 440, the value $PN_1$ is reset to zero at the block 452, and otherwise, the program jumps to the end. Thereafter, the value of the correcting counter $\Delta I$ is decremented by value by 1. Per 1 of the correcting counter value $\Delta I$, the feedback control value is reduced by 0.5 percent of the output of the integral element.

It will be appreciated that, between the programs shown in FIGS. 11 and 12, there is principal difference that the calculation of the value LP, which corresponds to the output of the proportional element, on the processing block 406 of FIG. 11 is not observed in FIG. 12. This is reason that mentioned herebefore; in case of the actual engine speed $N_{RPM}$ exceeding the reference engine speed, it is not necessary nor it is desirable not to make control the engine by the value LP for avoiding hunting of the engine, which otherwise will possibly occur.

Now return to FIG. 12, as mentioned above, when the actual engine speed $N_{RPM}$ is more than 2400 r.p.m., i.e., engine speed being in a range TC=1 of FIG. 10, the correcting counter value $\Delta I$ is decremented by 1 per every fifteen rotations of the engine. When the actual engine speed $N_{RPM}$ is equal to or less than 2400 r.p.m. but more than 1200 r.p.m. and the difference N is more than 300 r.p.m., i.e., the engine speed being in a range TC=1 of FIG. 10, the correction counter value $\Delta I$ is decremented by 1 per every one cycle of engine revolutions. When the actual engine speed $N_{RPM}$ is equal or less than 2400 r.p.m. and the difference $\Delta N$ is equal or less than 150 r.p.m., i.e., the engine speed being in a range TC=5 of FIG. 10, the correction counter value $\Delta I$ is decremented by 1 per every five cycles of the engine revolution. In the remaining range of engine speed, i.e.:

actual engine speed $N_{RPM}$ is more than 1200 r.p.m. but equal to or less than 2400 r.p.m., and the difference is more than 150 r.p.m. but less than 300 r.p.m.; and actual engine speed $N_{RPM}$ is equal or less than 1200 r.p.m. and the difference $\Delta N$ is equal or more than 300 r.p.m., which is included in a range TC=3 of FIG. 10, the value of the correction counter $\Delta I$ is incremented by one per every three cycles of the engine revolution.

In the meanwhile, in case of using two of bits (8 bits- =one byte) as the value of the correction counter $\Delta I$ and the most significant bit of each counter value being indicative of plus or minus of the value, the value of the correction counter $\Delta I$ will be in a range of from plus 127 to $-128$. Therefore, the control value will be corrected in a range $+64$ percent to $-64$ percent, if each unit of the $\Delta I$ corresponds to 0.5%. If the correction counter value $\Delta I$ exceeds the abovementioned range, i.e. the range between 127 and $-128$, the maximum-value, 127 or minimum value, $-128$ will be regarded as the correction counter value $\Delta I$. On the other hand, one byte (=eight bits) will be used for operation of actual engine speed $N_{RPM}$ within a range of 12.5 to 3200 r.p.m. as such a manner shown in FIG. 6(B). Thereby the actual engine speed $N_{RPM}$ can be operated at a maximum of 3185.5 r.p.m. (3,200 $-12.5$). Indeed, even if the actual engine speed $N_{RPM}$ exceeds 3200 r.p.m., it can be operated as 3187.5 r.p.m., since operating at a higher range of a engine speed will be unnecessary for idle engine control. Actually, exceeding 3200 r.p.m. of engine speed will probably not occur during idling.

Thus, the present invention has fulfilled all of the objects and advantages sought thereby. While the present invention has been shown and described with respect to a preferred embodiment, it should not, however, be considered as limited to that embodiment or any other embodiment. Further, variations could be made to the form and the details of any parts or elements, without departing from the principle of the invention.

What is claimed is:

1. An engine idling speed control system for an internal combustion engine, which system includes a primary and auxiliary air induction system, an idle air control valve incorporated in said auxiliary air induction system, said idle air control value being associated with an electromagnetically operable actuator which controls opening and closing of said idle air control valve, which system comprises:

a first sensor for determining engine temperature and in response producing a first sensor signal;

a second sensor for determining revolution speed of the engine and in response producing a second sensor signal;

first means for determining a reference engine speed based on the value of said first sensor signal, said reference engine speed being maintained (1) at a first constant value when the determined engine temperature is lower than a first predetermined value, (2) at a second constant value when the engine temperature is in a normal engine temperature range which is defined by a second predetermined value, higher than said first predetermined value and a third predetermined value, higher than said second predetermined value, and (3) at a third constant value while the engine is in an overheated condition in which the engine temperature is higher than a predetermined fourth value, higher than said third predetermined value, said reference engine speed being varied linearly from said first constant value to said second constant value when the engine temperature is in a range between said first and second predetermined values and said reference engine speed is varied linearly from said second constant value to said third constant value when said engine temperature is in a range between said third and fourth predetermined values;

second means responsive to the second sensor signal and said first means for determining a difference between the determined engine speed and said reference engine speed and for determining a closed loop control value based on the determined difference, said second means producing a pulse signal having a duty cycle representative of the determined closed loop control value, said duty cycle defining the ratio of the opening and closing periods of said idle air control valve in order to control the engine speed to reduce the difference between the determined engine speed and the reference engine speed, and means for feeding said pulse signal to said actuator.

2. A control system, as recited in claim 1, wherein said system further comprises third means for determining a first correction value of said reference engine speed based on an engine load condition, said third means including load sensitive means for sensing engine parameters and for determining said engine load.

3. A control system, as recited in claim 1, wherein said system further comprises fourth means for determining an engine condition with respect to inputs fed from said first and second sensors and said engine load sensitive means, said fourth means operating to selectively carry out open loop control and closed loop control based on said determined engine condition, said fourth means including a pulse signal generator producing a pulse signal and comprising a proportional component and an integral component for determining response characteristics of said pulse signal generator in the closed loop control.

4. A control system, as recited in claim 2, further including a battery and a fifth means for determining a second correction value of said reference engine speed in response to reduction of said battery voltage below a given value for a period of time exceeding a given time.

5. A control system, as recited in claim 1, 2 or 3, wherein said system is provided with a means for permitting manual correction of said duty cycle.

6. A control system, as recited in claim 2, wherein the engine is positioned within a vehicle having a transmission and an air conditioning unit and said engine load condition is determined depending on the kind of transmission, whether the transmission is in drive or neutral and whether said air conditioning unit is on or off.

7. A control system, as recited in claim 6, wherein said third means limits a minimum reference engine speed when the kind of transmission is the manually operative type, and said third means also limits a maximum reference engine speed when said transmission is shifted to the drive position.

8. A control system, as recited in claim 3, wherein said fourth means determines constants of said proportional component and integral component of said pulse signal generator based on said engine speed and difference between said engine speed and said reference engine speed in order to determine response characteristics of said pulse signal generator.

9. A control system, as recited in claim 8, wherein the constant of said proportional component is set to 0 when said engine speed exceeds said reference engine speed.

10. A control system as recited in claim 1, 2 or 3, wherein said first predetermined value is 30° C. and said first constant value is 1400 r.p.m.

11. A control system for controlling an idle air flow rate for an internal combustion engine in an automotive vehicle comprising in combination:

a bypass passage provided in an air intake passage connecting an air intake and intake manifold of the internal combustion engine, said bypass passage bypassing a throttle valve provided in said intake air passage to connect said air intake to said intake manifold therethrough;

an intake air control valve means interposed within said bypass passage, said valve means including an electromagnetically operated actuator means which varies the ratio of opening and closing of said valve means in response to a control signal applied thereto, said control signal having a corresponding ratio for energizing and deenergizing said actuator means;

a microcomputer including an interface, memory unit and central processing unit, said microcomputer processing inputs for effecting open loop control or closed loop control for determining said control signal to be applied to said actuator means of said valve means;

a first sensor for measuring an engine temperature and in response generating a first sensor signal;

a second sensor for determining engine speed and in response producing a second sensor signal;

said microcomputer including first means for determining a reference engine speed based on the value of said first sensor signal, said reference engine speed being maintained (1) at a first constant value when the determined engine temperature is lower than a first predetermined value, (2) at a second constant value when the engine temperature is in a normal engine temperature range which is defined by a second predetermined value, higher than said first predetermined value and a third predetermined value higher than said second predetermined value, and (3) at a third constant value while the engine is in an overheated condition in which the engine temperature is higher than a predetermined fourth value higher than said third predetermined value, and said reference engine speed being varied linearly from said first constant value to said second constant value when the engine temperature is in a range between said first and second predetermined values; and said reference engine speed is varied linearly from said second constant value to said third constant value when said engine temperature is in a range between said third and fourth predetermined values; and said microcomputer including second means for determining said control signal for closed loop control based on said engine speed and a difference between said determined engine speed and said reference engine speed, said second means including a control signal generator having a proportional element determining a proportional constant for determining said control signal depending on the difference between the determined engine speed and the reference engine speed and an integral element determining an integral constant for determining said control signal depending on the determined engine speed and the difference between the determined engine speed and the reference engine speed.

12. A control system as recited in claim 11, wherein said vehicle has one of an automatic and manual transmission and said microcomputer further comprises:
third means for determining a first correction value for correcting said reference engine speed with respect to the kind of transmission, said third means increasing the minimum reference engine speed by a given amount when the transmission is a manual type; and
fourth means detecting a transmission gear position between a driving range and neutral range to determine a second correction value to further correct said reference engine speed depending on said transmission gear position, said fourth means limiting a maximum reference engine speed at a given value when said transmission is in driving position.

13. A control system, as recited in claim 11 or 12, wherein said vehicle includes an air conditioner and said microcomputer further comprising:
fifth means for determining third correction values for correcting said reference engine speed depending upon the on or off condition of the air conditioner.

14. A control system, as recited in claim 13, wherein said vehicle has a battery and said microcomputer further comprises:
sixth means for determining a fourth correction value for correcting said reference engine speed in response to a drop of the vehicle battery voltage below a given value, said sixth means increasing said reference engine speed by a given amount.

15. A control system as recited in claim 11, wherein said proportional element maintains the proportional constant at a given value when the determined engine speed is lower than said reference engine speed by at least a given amount, and reduces the proportional constant to approach 0 as said difference decreases and being maintained 0 when said determined engine speed is higher than said reference engine speed, and said integral element determines the integral constant based on both said actual engine speed and the absolute value of said difference.

16. A control system, as recited in claim 1 or 11, wherein said temperature range is 0° C. to 30° C. and said reference engine speed within said given temperature range is 1400 r.p.m.

17. A control system, as recited in claim 12, wherein said given rate for increasing said minimum reference engine speed when the transmission is a manual type, is 50 r.p.m.

18. A control system, as recited in claim 12, wherein said given maximum reference engine speed is 800 r.p.m.

19. A method for controlling air flow rate for an internal combustion engine,
comprising in steps:
a first step for determining a reference engine speed corresponding to the engine temperature, said first means including a table data indicative of reference engine speed corresponding each of engine temperature, said table data including a given temperature range to be kept the reference engine speed in a given even speed, said temperature range being a range of normal atmospheric temperature;
a second step for correcting said reference engine speed with respect to kind of transmission, and increasing minimum refernece engine speed at a given rate when the transmission is a manual type; and
a third step determining a transmission positions between a dring range and neutral range to further correct said reference engine speed corresponding said transmission position, and limiting a maximum reference engine speed at a give value when said transmission is in driving range;
a fourth step for correcting said reference engine speed corresponding to on and off position of an air conditioner mounted on the vehicle;
a fifth step for processing an actual engine speed data to determine difference between said actual engine speed and said reference engine speed and determine constants of a proportional element and intergral element of a control signal generator for generating a control signal in feedback control corresponding to said difference and said actual engine speed;
a sixth step for determining and generating pulse signal indicative of said pulse duty based on said control signal and outting said pulse signal to an electromagnetically operative actuator means of an intake air control valve means for varying the ratio of energized period and deenergized period of said actuator means for controlling air flow rate.

20. A method, as recited in claim 19, wherein said temperature range is 0° C. to 30° C. and said even engine speed is 1400 r.p.m.

21. A method, as recited in claim 19, wherein said given rate for increasing said minimum reference speed determined at second step when said transmission is a manual type, is 50 r.p.m. and said given maximum reference engine speed determined at the third step when the transmission is in drive range, is 800 r.p.m.

22. A method, as recited in claim 21, wherein said method further comprises a step for correcting said reference engine speed corresponding to dropping of a vehicle battery when the battery voltage is maintained below a given voltage more than a given period of time, and increasing said reference engine speed at a given rate.

23. A method, as recited in claim 22, wherein said give voltage is 12 volts and said given rate is 100 r.p.m., and incrementation of said reference engine speed in response to drop of the battery voltage is not carried out to exceed 800 r.p.m. of the reference engine speed.

24. A method, as recited in claim 19, wherein said control signal generator has a proportional element and integral element, constant of said proportional element being kept in a given even value when said actual engine speed is lower than said reference engine speed exceeding a given value, and being reduced to approach to zero corresponding decreasing of said difference and maintained zero when said actual engine speed is higher than said reference engine speed, a constant of said integration element being varied corresponding to both of said actual engine speed and the absolute value of said difference.

25. A method, as recited in claim 24, wherein said method further includes a step for checking over-flow with respect to value of said control signal which is indicated by eight bits of data in a range 127 to −128 and said overflow checking step defines a range of the value of said control signal by determining a maximum and minimum value when said value exceeds said range, said value is corrected to said maximum or minimum value.

26. The control system as set forth in claim 25, which further comprises third means for checking over-flow of said control signal value with respect to capacity of said second means.

27. A method for controlling an intake air control valve for an internal combustion engine, which control valve includes an electromagnetically controlled actuator, comprising in steps:
   a first step for determining a reference engine speed corresponding to the engine temperature, said first means including a table data indicative of reference engine speed corresponding to an engine temperature, said table data including a given temperature range to be maintained when the reference engine speed is in a given even speed, said temperature range being a range of normal atmospheric temperature;
   a second step for correcting said reference engine speed with respect to the kind of transmission, and increasing minimum reference engine speed at a given rate when the transmission is a manual type;
   a third step for determining transmission positions between a driving range and neutral range to further correct said reference engine speed corresponding to said transmission position, and limiting a maximum reference engine speed at a given value when said transmission is in driving range;
   a fourth step for correcting said reference engine speed corresponding to on and off position of an air conditioner mounted on the vehicle;
   a fifth step for processing actual engine speed data to determine differences between said actual engine speed and said reference engine speed and determine constants of a proportional element and integral element of a control signal generator for generating a control signal in feedback control corresponding to said difference and said actual engine speed;
   a sixth step for determining the corrected air flow rate and generating a pulse signal indicative of a pulse duty based on said control signal indicative of the corrected air flow rate; and
   a seventh step for putting said pulse signal to the electromagnetically operative actuator means of the intake air control valve means and for controlling the ratio of energized period and deenergized period of said actuator means for controlling air flow rate to said corrected value.

28. A method, as recited in claim 27, wherein said temperature range is 0° C. to 30° C. and said even engine speed is 1400 r.p.m.

29. A method, as recited in claim 27, wherein said given rate for increasing said minimum reference speed determined at the second step when said transmission is a manual type, is 50 r.p.m. and said given maximum reference engine speed determined at the third step when the transmission is in drive range, is 800 r.p.m.

30. A method, as recited in claim 29, wherein said method further comprises a step for correcting said reference engine speed corresponding to dropping of a vehicle battery when the battery voltage is maintained below a given voltage more than a given period of time, and increasing said reference engine speed at a given rate.

31. A method, as recited in claim 30, wherein said given voltage is 12 volts and said given rate is 100 r.p.m., and incrementation of said reference engine speed in response to drop of the battery voltage is not carried out to exceed 800 r.p.m. of the reference engine speed.

32. A method, as recited in claim 27, wherein said control signal generator has a proportional element and integral element, the constant of said proportional element being kept in a given even value when said actual engine speed is lower than said reference engine speed exceeding a given value, and being reduced to approach to zero corresponding decreasing of said difference and maintained zero when said actual engine speed is higher than said reference engine speed, a constant of said integration element being varied corresponding to both of said actual engine speed and the absolute value of said difference.

33. A method, as recited in claim 32, wherein said method further includes a step for checking over-flow with respect to the value of said control signal which is indicated by eight bits of data in a range 127 to −128 and said overflow checking step defines a range of the value of said control signal by determining a maximum and minimum value when said value exceeds said range, said value is corrected to said maximum or minimum value.

34. The control system as set forth in claim 28, wherein said control signal generator varies the gain constant of said integral component depending upon said second signal value and said difference.

35. An idle speed control system for an automobile internal combustion engine comprising:
   a primary air induction system incorporating a throttle valve for controlling primary air flow therethrough;
   an auxiliary air induction system bypassing said throttle valve and incorporating an idle air control valve for controlling auxiliary air flow rate;
   an electromagnetically operable actuator associated with said idle air control valve for opening and closing said idle air control valve in response to a pulse signal having a duty cycle defined by a control value;
   a first sensor for determining engine temperature and producing a first sensor signal representative of the determined engine temperature;
   a second sensor determining engine revolution speed and producing a seond sensor signal representative of the determined engine speed;
   a microcomputer including a memory storing predetermined reference engine speed data with respect to the determined engine temperature, said stored data including a first constant value to be accessed in response to said first sensor signal having a value lower than a first preset value, a second constant value to be accessed in response to the first sensor signal having a value in a range between a second preset value higher than said first preset value and third preset value higher than said preset value and a third constant value to be accessed response to the sensor signal having a value larger than a fourth preset value higher than said third preset value, said data corresponding to said first sensor signal value between said first and second preset values and said third and fourth preset values varying linerarly from said first constant value to said second constant value and from said second constant value to said third constant value, said microcomputer comparing the determined engine speed with the determined reference engine speed in order to obtain the difference therebetween, calculating a basic control value based on the obtained difference, correcting said basic control value based on a porportional constant determined depending on the determined difference and an integral constant determined depending on the determined difference and the determined engine speed, producing a pulse signal having a duty cycle representative of the control value for defining energized periods and deenergized periods of said actuator for closed loop control of said auxiliary air flow rate so that the engine speed is controlled to reduce the difference between the engine speed and reference speed to zero.

36. An idle speed control system for an automotive internal combustion engine comprising:

a primary air induction system incorporating a throttle valve for controlling primary air flow therethrough;

an auxiliary air induction system bypassing said throttle valve and incorporating an idle air control valve for controlling auxiliary air flow rate;

an electromagnetically operable actuator associated with said idle air control valve for opening and closing said idle air control valve in response to a pulse signal having a duty cycle defined by a control value;

a first sensor for determining engine temperature and in response producing a first sensor signal;

a second sensor determining engine revolution speed and in response producing a second sensor signal;

a microcomputer including a memory storing predetermined reference engine speed data with respect to the determined engine temperature, said stored data including a first constant value to be accessed in response to said first sensor signal having a value lower than a first preset value, a second constant value to be accessed in response to the first sensor signal having a value in a range between a second preset value higher than said first preset value and a third preset value higher than said second preset value and a third constant value to be accessed in response to the sensor signal having a value larger than a fourth preset value higher than said third preset value, said data corresponding to said first sensor signal value between said first and second preset values and said third and fourth preset values varying linearly from said first constant value to said second constant value and from said second constant value to said third constant value, said microcomputer comparing the determined engine speed with the determined reference engine speed in order to obtain the difference therebetween, calculating a basic control value based on the obtained difference and said second sensor signal value, correcting said basic control value depending on the kind of transmission, either automatic or manual, and the determined engine speed, and producing a pulse signal having a duty cycle representative of the control value for defining energized periods and deenergized periods of said actuator for closed loop control of said auxiliary air flow rate so that the engine speed is controlled to reduce the difference between the engine speed and reference speed to zero.

37. A control system as recited in claim 35, further including a vehicle transmission and wherein said microcomputer further includes means for determining a first correction value for correcting said reference engine speed with respect to the kind of transmission, said third means increasing the minimum reference engine speed by a given amount when the transmission is a manual type; and said microcomputer including fourth means for detecting driving range and neutral range transmission gear positions to determine a second correctior value to further correct said reference engine speed depending on said transmission gear position, said fourth means limiting a maximum reference engine speed at a given value when said transmission is in a driving position.

38. A control system, as recited in claim 35, 36 or 37, further including a vehicle air conditioner and wherein said microcomputer further includes fifth means for determining third correction values for correcting said reference engine speed depending upon the on or off condition of said air conditioner mounted on the vehicle.

39. A control system as recited in claim 38, further including a vehicle battery and wherein said microcomputer further includes sixth means for determining a fourth correction value for correcting said reference engine speed in response to a drop of said vehicle battery voltage below a given value, said sixth means increasing said reference engine speed by a given amount.

40. A control system as set forth in claim 35, wherein said microcomputer maintains the proportional constant at a given value when the determined engine speed is lower than said reference engine speed by at least a given amount, and gradually reduces the proportional constant to approach 0 as said difference decreases and being maintained at 0 when said determined engine speed is higher than said reference engine speed, said microcomputer developing said integral constant based on both of said actual engine speed and the absolute value of said difference.

41. The method as set forth in claim 37, wherein said porportional component is set at zero when said engine speed is higher than said target engine speed and is varied according to a predetermined non-linear characteristic with respect to said difference between the engine speed and the target engine speed when the engine speed is lower than said target engine speed.

42. An idle engine speed control system for an internal combustion engine, comprising:

a bypass passage through which idle air flows, bypassing a throttle valve in a primary air induction passage;

an idle air control valve operated by an electromagnetically operable actuator for controlling the flow rate of said idle air through said bypass passage;

an engine coolant temprature sensor means adapted for producing a temperature signal having a value representative of an engine coolant temperature;

an engine speed sensor means for producing an engine speed signal having a value proportional to a speed of said engine;

first means responsive to said temperature signal for determining a target engine speed, said first means producing a reference signal having a value representative of the target engine speed;

second means for comparing said engine speed signal value with said reference signal value to determine a difference therebetween, said second means producing a feedback control signal having a value in dependence of said difference to feedback control a duty cycle of said electromagnetically operable actuator to reduce to zero the difference between said engine speed and said target engine speed; and a control signal generator means incorporated in said second means for determining said control, a proportional component and integral component thereof having respective gains that are variable depending upon said engine speed signal value for variation of a response characteristics of said control signal generator means in relation to variations of said engine speed.

43. The control system as set forth in claim 42, wherein said proportional and integral components include respective gain constants.

44. The control system as set forth in claim 43, wherein said control signal generator varies said gain constants depending upon a difference between said engine speed signal value and said reference signal value.

45. The control system as set forth in claim 44, wherein said control signal generator varies the gain constant of said proportional component to zero in a region wherein said second signal value is larger than said reference signal value and in accordance with a predetermined non-linear characteristic with respect to said difference in a region wherein said second signal value is smaller than said reference signal value.

46. The system as set forth in claim 42, wherein said first means includes means for determining said target engine speed by comparing said temperature signal value with first and second temperature thresholds defining a predetermined warmed engine temperature range and with third and fourth temperature thresholds which define a predetermined cold engine temperature range, said first means determining said target engine speed at a first predetermined constant value when said temperature signal value is maintained within said predetermined warmed engine temperature range and at a second predetermined constant value when said temperature signal value is maintained at said predetermined cold engine range.

47. The control system as set forth in claim 46, which further comprises an engine load sensor for producing a load signal having a value representative of a load condition on the engine, and fourth means responsive to said load signal for producing a first correction signal for correcting said reference signal value, said first correction signal being variable as a function of said load signal value.

48. The control system as set forth in claim 47, which further comprises fifth means for controlling said control signal to have a value determined depending upon said temperature signal value, for open loop controlling said electromagnetically operable actuator, and sixth means for detecting a predetermined feedback condition in engine operation and in response activating said second means and disabling said fifth means as said feedback condition is detected and otherwise activating said fifth means and disabling said second means.

49. The control system as set forth in claim 47, wherein the first correction signal produced by said fourth means has a correction coefficient for determining said first correction signal value, which correction coefficient is variable depending upon the kind of transmission, i.e., manual transmission or automatic transmission, transmission gear position, i.e, neutral or shifted positions and a switch position of an air conditioner, i.e. ON or OFF.

50. The control system as set forth in claim 49, which further comprises seventh means for limiting a minimum target engine speed when the transmission is a manual transmission and a maximum target engine speed when the transmission is shifted.

51. The control system as set forth in claim 50, wherein said target engine speed in the engine coolant temperature range between 0° C. to 30° C., is set at 1400 r.p.m.

52. A method for controlling an engine idling speed in an internal combustion engine having a primary air induction passage with a throttle valve, a bypass passage bypassing said throttle valve and passing idle air therethrough, and an idle air control valve with a valve actuator which is electromagnetically operable, comprising the steps of:

detecting a temperature condition of an engine coolant and in response producing a temperature signal having a value representative of the engine coolant temperature;

detecting an engine speed and in response producing an engine speed signal having a value porportional to said engine speed;

determining a target engine speed in dependence of said first signal value and in response producing a reference signal having a value representative of the target engine speed;

determining a proportional component of a control signal value in dependence of a difference between said engine speed signal value and said reference signal value;

determining an integral component of said control signal value in dependence of said engine speed signal value and said difference between said engine speed signal value and said reference signal value;

producing a control signal having said control signal value including said proportional component and said integral component for defining a duty cycle of said valve actuator; and feedback controlling said valve actuator with said control signal to reduce to zero the difference between the engine speed and the target engine speed.

* * * * *